Sept. 17, 1957 P. M. MAXWELL 2,806,737
INFLATABLE COLLISION SHIELD FOR VEHICLES
Filed April 11, 1955 2 Sheets-Sheet 1

INVENTOR.
PAUL M. MAXWELL
BY
Knox & Knox

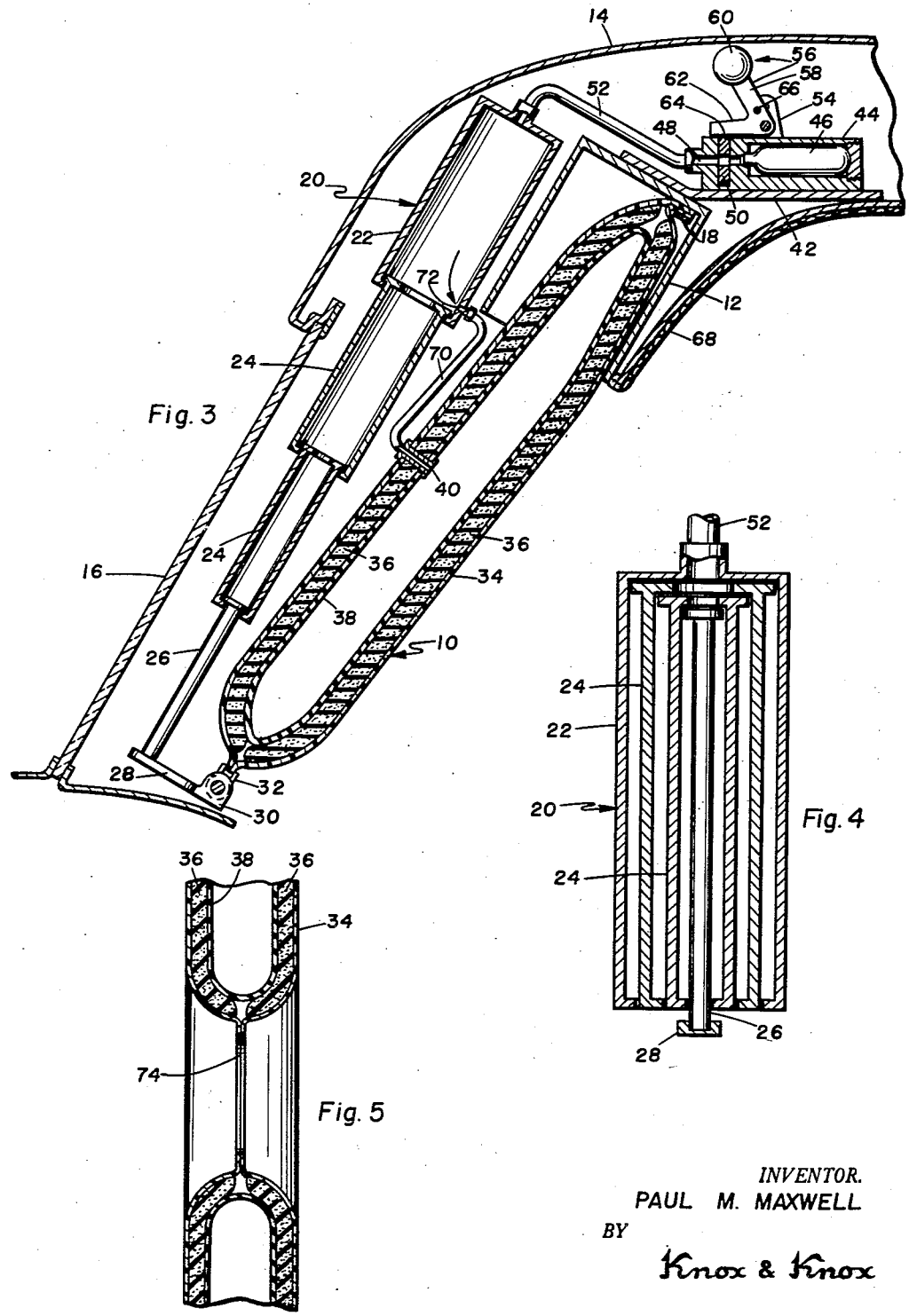

United States Patent Office 2,806,737
Patented Sept. 17, 1957

2,806,737
INFLATABLE COLLISION SHIELD FOR VEHICLES
Paul M. Maxwell, San Diego, Calif.
Application April 11, 1955, Serial No. 500,534
8 Claims. (Cl. 296—84)

The present invention relates generally to safety equipment for motor vehicles and more particularly to an inflatable collision shield for vehicles.

The primary object of this invention is to provide a shield which is extended to cover the windshield of a vehicle in the event of a collision to protect the passengers from being thrown against the windshield glass.

Another object of this invention is to provide a collision shield which is effectively padded and which is automatically inflated when fully extended to increase the shock absorbing qualities.

Another object of this invention is to provide a collision shield which is operated by a telescopic member, the action of which is initiated by an inertia controlled device, and the actual extension of which is accomplished in response to pneumatic pressure combined with inertia in the event of a sudden stop or collision.

Another object of this invention is to provide a collision shield which is extremely fast in operation.

Another object of this invention is to provide a collision shield which is adapted for fabrication from many different materials, so that the choice of material can be according to the dictates of availability and price considerations, the exact sizes and proportions being matters easily determined to suit particular conditions and needs.

Another object of this invention is to provide a collision shield which is practicable and inexpensive to manufacture.

Finally, it is an object to provide a collision shield of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure and wherein similar characters of reference indicate similar or identical elements and portions throughout the specification and throughout the views of the drawings, and in which:

Fig. 3 is an enlarged sectional view taken on the line 3—3 of Fig. 2.

Fig. 4 is an enlarged sectional view of the telescopic member taken on the line 4—4 of Fig. 1.

Fig. 5 is an enlarged fragmentary sectional view taken on the line 5—5 of Fig. 2.

Figure 1:
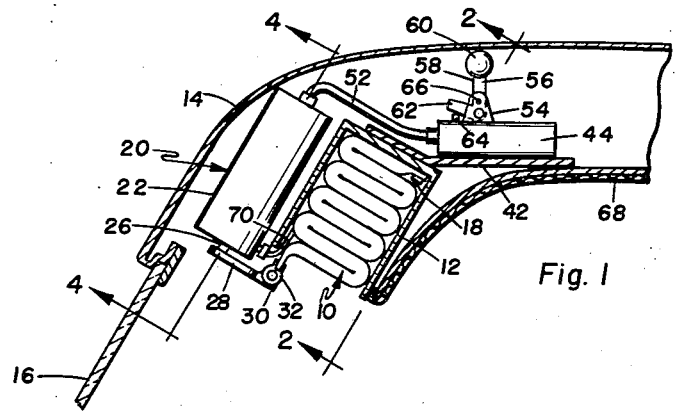
Fig. 1 is a fragmentary vertical sectional view of the portion of a vehicle body above the windshield, showing the installation of the shield.

Referring now to the drawing in detail, the shield 10 is stored in accordion folded position in a container 12 which is fixed into the roof portion 14 of a vehicle adjacent the windshield 16. The container 12 extends substantially the full width of the windshield 16 and the upper end of the shield 10 is fixed to the inside of said container by a suitable retaining strip 18 or the like.

Mounted forwardly of the container 12 and substantially centrally relative to the windshield is a telescopic jack 20 comprising an outer cylinder 22 in which are a plurality of concentric slidable tubular portions 24 and a final inner rod 26. The actual structure of the jack 20 and the number of sliding portions used may be varied to suit requirements, such devices being well known. The outer cylinder 22 is fixed in any suitable manner to the container 12 or to the surrounding structure so that the slidable elements extend downwardly generally parallel to the windshield 16. Fixed to the lower end of the rod 26 is a rearwardly projecting arm 28 having a lug 30 at the end thereof. The lower end of the shield 10 is stiffened by a rigid cross bar 32 fixed thereto and extending the full width of the shield, said cross bar being suitably secured to the lug 30.

The shield 10 itself comprises a flexible outer bag 34 of plastic, rubber, fabric or the like which is padded by an internal resilient pad 36 applied in the form of a layer to the inner surface of the bag, the pad being of sponge rubber or the like. Also inside the outer bag 34 is an inflatable inner bag 38 of suitable impervious material, said inner bag having an inlet tube 40 extending through the pad 36 and to the exterior of the shield 10 approximately centrally therein.

Secured above the container 12 is a bracket 42 on which is mounted an inertia operated valve unit 44. Fitted into the valve unit 44 is a pressurized gas capsule 46, such as a carbon dioxide cartridge, which communicates with an outlet bore 48, said outlet bore being interrupted by a valve 50. The outer cylinder 22 is connected to the valve unit 44 by a supply tube 52 from said cylinder to the outlet bore 48. Fixed to the top of the valve unit 44 is a bracket 54 in which is pivotally mounted a generally L shaped lever 56, said lever having an upwardly extending arm 58 on the end of which is an inertia weight 60, and a forwardly extending actuating arm 62. This actuating arm 62 bears on the upwardly protruding end 64 of the valve 50. To prevent inadvertent operation of the valve, the lever 56 is held in place by a shear pin 66 passing through the lever and through the bracket 54.

When retracted the device is substantially concealed in the roof of the vehicle above the roof lining 68. In the event of a collision or a sudden stop sufficiently violent to throw passengers through the windshield, the inertia weight 60 is thrown forwardly, the correct strength of the shear pin 66 being predetermined. This action causes the actuating arm 62 to depress and open the valve 50 allowing the pressurized gas to enter and extend the jack 20. Inertia also functions in unison with the pneumatic pressure, to accelerate the extension of the jack and shield. The shield 10 is thus pulled forcibly from its container 12 and extended to cover the windshield 16, as shown in Figs. 2 and 3.

To increase the shock absorbing qualities of the shield 10, the inner bag 38 is inflated when the shield is fully extended. This is accomplished by connecting the inlet tube 40, by means of a connecting tube 70, to an outlet port 72 in the outer cylinder 22, said outlet port being positioned adjacent the lower end of the cylinder so that it is uncovered when the slidable portions 24 are fully extended, as in Fig. 3. Thus the excess gas escapes into the inner bag 38 and expands the shield 10, after the initial pressure has been used to extend the shield across the vehicle windshield. Since the shield is not inflated until it is first extended, binding of the shield within the container 12 is prevented.

Figure 2:
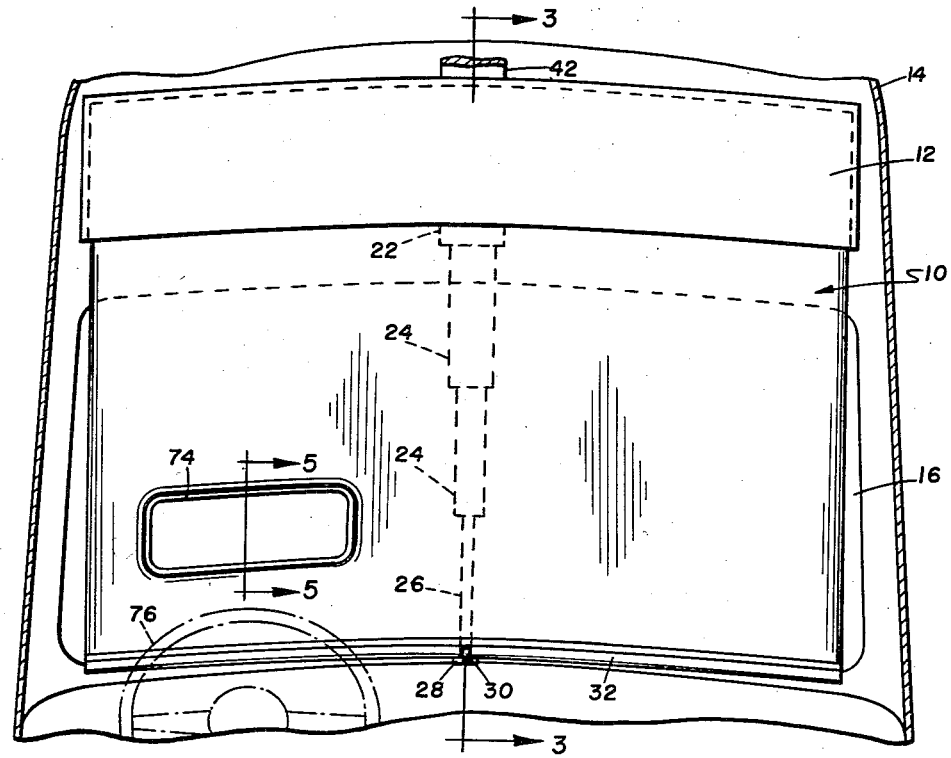
Fig. 2 is a sectional view taken on the line 2—2 of Fig. 1 with the shield fully extended.

To provide the driver of the vehicle with a certain amount of visibility during a collision, the shield 10 has a viewing slot 74 which is disposed slightly above the vehicle's steering wheel 76 when the shield is extended, as illustrated in Fig. 2. This viewing slot 74 does not impair the driver's safety since, in a violent collision, the driver is thrown upwardly over the steering wheel to strike the upper portion of the shield, well above the slot. The outer bag 34 may be easily sealed around the viewing slot 74, as in Fig. 5, the pad 36 and inner bag 38 being constructed to suit. The viewing slot 74 enables the driver to see the road ahead in the event that the vehicle is struck a glancing blow or continues to move after a collision, thus allowing the driver to avoid further damage.

The device is adaptable to many types of vehicles and may be constructed as a unit to simplify installation. It should be understood that the valve unit 44 as shown is exemplary and many other types of devices may be used to extend the jack 20, such as electrically or inertia actuated cartridges which produce gas chemically or explosively, or other mechanisms which will be evident to those skilled in the art. Further, different types of valves may be used with the pressurized capsule type of mechanism as illustrated.

In all but major collisions in which the vehicle is virtually demolished, the major cause of injuries is due to the propelling of passengers against or through the windshield. The resultant cuts and abrasions often permanently deface the victim and may even result in death. The present device protects the passengers from direct contact with the windshield and, even though the glass may actually be broken by the violence of collision, the padded shield provides effective protection against glass fragments.

The location of the device is not necessarily limited to the roof portion of the vehicle, it being equally feasible to mount the shield below the instrument panel for upward extension in certain types of vehicles where structure permits. In fact, this alternative installation may be more desirable in vehicles having a shallow roof structure, or in convertible top vehicles.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the forms of the invention disclosed herein may be made without departure from the spirit and scope of the invention, and that the specification and drawing are to be considered as merely illustrative rather than limiting.

I claim:

1. In a vehicle, a collision shield assembly comprising: a container fixed adjacent to the vehicle windshield and extending substantially parallel to one transverse edge thereof; a flexible padded shield stored in collapsed position in said container; a telescopic member operatively connected to said shield to extend the shield to cover the vehicle windshield; inertia actuated means operatively connected to extend said telescopic member, and means to inflate said shield when extended.

2. In a vehicle, a collision shield assembly comprising: an elongated container fixed in the roof portion of the vehicle adjacent the upper edge of the windshield; a flexible inflatable shield stored in folded position in said container; a telescopic member operatively connected to one end of said shield to extend the same to cover the vehicle windshield; inertia actuated means operatively connected to extend said telescopic member; and means to inflate said shield when the telescopic member is fully extended.

3. A collision shield according to claim 2, wherein said shield has an opening therein positioned to provided limited forward visibility for the driver of the vehicle when the shield is fully extended.

4. In a vehicle, a collision shield assembly comprising: an elongated container fixed in the roof portion of the vehicle adjacent the upper edge of the windshield; a flexible inflatable shield stored in folded position in said container; a telescopic member operatively connected to one end of said shield to extend the same to cover the vehicle windshield; a source of pressurized fluid communicating with said telescopic member; inertia actuated means operatively connected to said source to release the fluid and cause said telescopic member to be extended; and means for conducting a portion of the fluid to said shield to inflate the same when said shield is fully extended.

5. In a vehicle, a collision shield assembly comprising: an elongated container fixed in the roof portion of the vehicle adjacent the upper edge of the windshield; a flexible inflatable shield stored in folded position in said container; a telescopic member operatively connected to one end of said shield to extend the same to cover the vehicle windshield; said telescopic member comprising an outer cylinder and a plurality of concentric extendable portions slidably mounted in said cylinder; a source of pressurized fluid communicating with said outer cylinder; inertia actuated means operatively connected to release the fluid and cause said extendable portions to be extended; said outer cylinder having an outlet port positioned to be uncovered when said extendable portions are fully extended; a tube connecting said outlet port to said shield to conduct fluid thereto to inflate said shield when the same is fully extended.

6. In a vehicle, a collision shield assembly comprising: an elongated container fixed in the roof portion of the vehicle adjacent the upper edge of the windshild; a flexible inflatable shield stored in folded position in said container; a substantially rigid cross bar fixed to one end of said shield; a telescopic member operatively connected to said cross bar to extend said shield to cover the vehicle windshield; the end of said shield remote from said cross bar being secured in said container; a source of pressurized fluid communicating with said telescopic member; inertia actuated means operatively connected to said source to release the fluid and cause said telescopic member to be extended; and means for conducting a portion of the fluid to said shield to inflate the same when said shield is fully extended.

7. In a vehicle, a collision shield assembly comprising: an elongated container fixed in the roof portion of the vehicle adjacent the upper edge of the windshield; a flexible inflatable shield stored in folded position in said container; said shield comprising an outer bag; a resilient pad lining the inner surface of said outer bag; and an inner inflatable bag contained within said pad; a telescopic member operatively connected to one end of said shield to extend the same to cover the vehicle windshield; a source of pressurized fluid communicating with said telescopic member; inertia actuated means operatively connected to said source to release the fluid and cause said telescopic member to be extended; and means for conducting a portion of the fluid to said shield to inflate the same when said shield is fully extended.

8. In a vehicle, a collision shield assembly comprising: an elongated container fixed in the roof portion of the vehicle adjacent the upper edge of the windshield; a flexible inflatable shield stored in folded position in said container; said shield comprising an outer bag; a resilient pad lining the inner surface of said outer bag; and an inner inflatable bag contained within said pad; a telescopic member operatively connected to one end of said shield to extend the same to cover the vehicle windshield; said telescopic member comprising an outer cylinder and a plurality of concentric extendable portions slidably mounted in said cylinder; a source of pressurized fluid communicating with said outer cylinder; inertia actuated means operatively connected to release the fluid and cause said extendable portions to be extended; said outer cylinder having an outlet port positioned to be uncovered when said extendable portions are fully extended; a tube connecting said outlet port to said inner bag to conduct fluid thereto to inflate said bag when the shield is fully extended.

References Cited in the file of this patent

UNITED STATES PATENTS

| | | |
|---|---|---|
| 2,050,141 | Wethington | Aug. 4, 1936 |
| 2,180,912 | Rogers | Nov. 21, 1939 |
| 2,412,793 | Weissman | Dec. 17, 1946 |
| 2,477,933 | Labser | Aug. 2, 1949 |
| 2,649,311 | Hetrick | Aug. 18, 1953 |

FOREIGN PATENTS

| | | |
|---|---|---|
| 870,071 | Germany | Mar. 9, 1953 |